Nov. 28, 1944.  F. R. MARTIN  2,363,888

PICKUP DEVICE FOR HARVESTER PLATFORMS

Filed May 14, 1942  2 Sheets-Sheet 1

INVENTOR
FLOYD R. MARTIN
BY
ATTORNEYS

Nov. 28, 1944.   F. R. MARTIN   2,363,888
PICKUP DEVICE FOR HARVESTER PLATFORMS
Filed May 14, 1942   2 Sheets-Sheet 2

INVENTOR.
FLOYD R. MARTIN
BY
ATTORNEYS

Patented Nov. 28, 1944

2,363,888

UNITED STATES PATENT OFFICE 2,363,888

PICKUP DEVICE FOR HARVESTER PLATFORMS

Floyd R. Martin, East Moline, Ill., assignor to Deere & Company, Moline, Ill., a corporation of Illinois Application May 14, 1942, Serial No. 442,989

13 Claims. (Cl. 56—364)

The present invention relates generally to harvesters and more particularly to pick-up devices of the type adapted to be mounted on the forward edge of the harvester platform for picking up crops which have been previously windrowed and left on the ground for a time to permit them to ripen or cure in the sun.

Heretofore, pick-up devices have been rigidly attached to the forward edge of the platform in a position overhanging the forward edge, in place of, or overhanging the usual cutter bar, which is not used in this operation. Heretofore, unless care has been exercised in laying straight windrows during the windrowing operation, some difficulty has been encountered in efficiently picking up a windrow with a pick-up device mounted on a large combine having a platform width of twelve feet or more. The reason for this difficulty in cases of crooked windrows, is due to the fact that the pick-up device is usually much narrower than the width of the platform and therefore it is necessary for the driver of the tractor to guide the tractor to maintain the pick-up device in register with the windrow at all times. This manipulation is rather difficult with large combines, particularly where the surface of the ground is rolling. Consequently, it has been necessary to build pick-up devices of substantially greater width than the width of a windrow, in order to accommodate minor variations in the latter.

The principal object of my invention, therefore, has to do with eliminating the necessity for maneuvering a large combine or other harvester laterally during forward movement in the field, to maintain a pick-up device in alignment with the windrow. More particularly, my invention relates to the provision of means for moving the pick-up device laterally relative to the platform, thus permitting the tractor and harvester to maintain a straight course down the field.

A related object of my invention is concerned with the provision of track means for supporting a pick-up device, providing for lateral sliding movement of the device relative to the platform. A still further object has to do with the provision of a flexible driving connection between a power shaft journaled on the combine and the pick-up mechanism, providing for transmitting power to the pick-up mechanism in any laterally adjusted position of the pick-up device.

Figure 1:
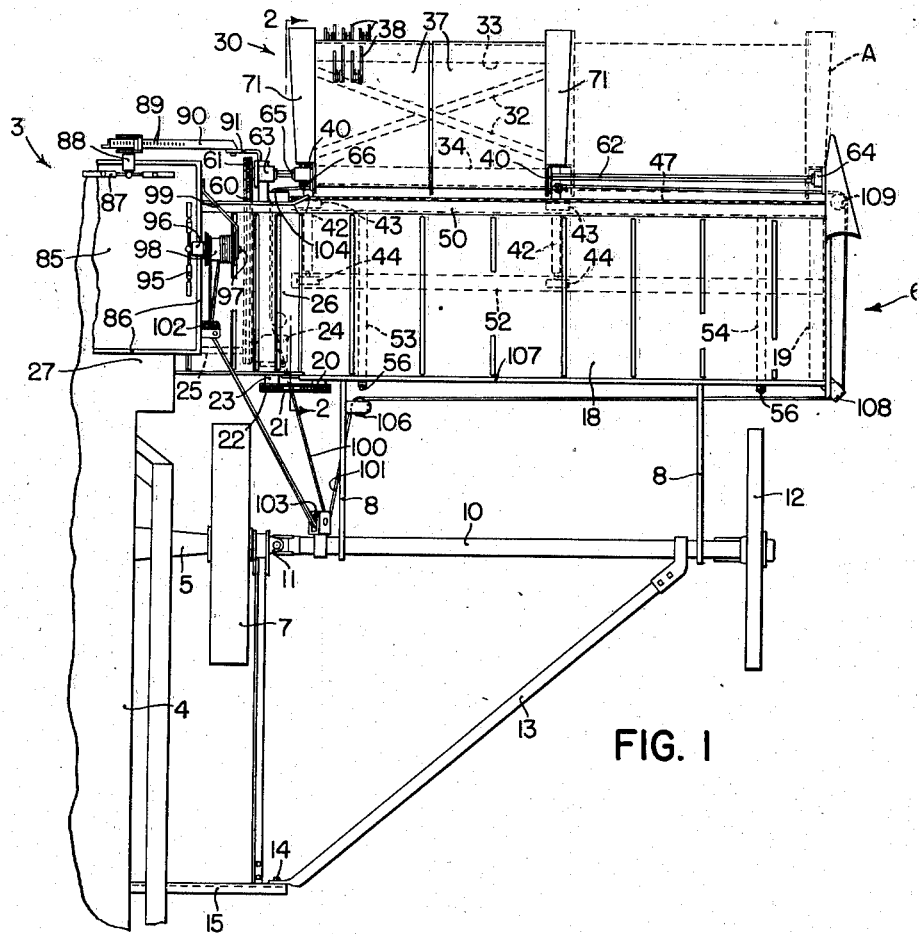
Figure 2:
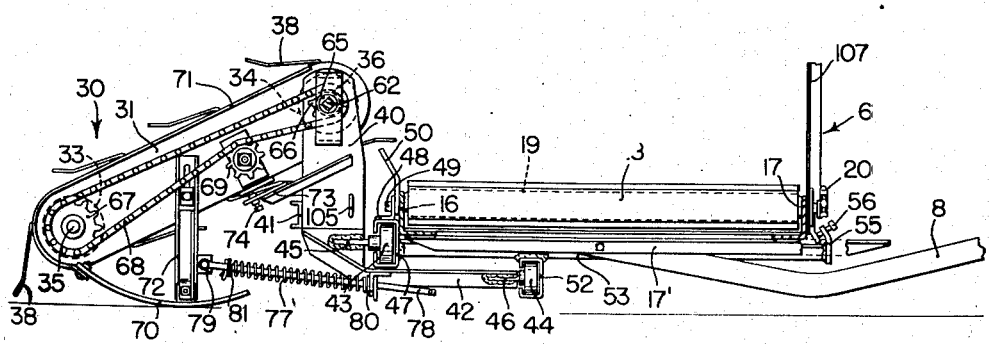
Figure 3:
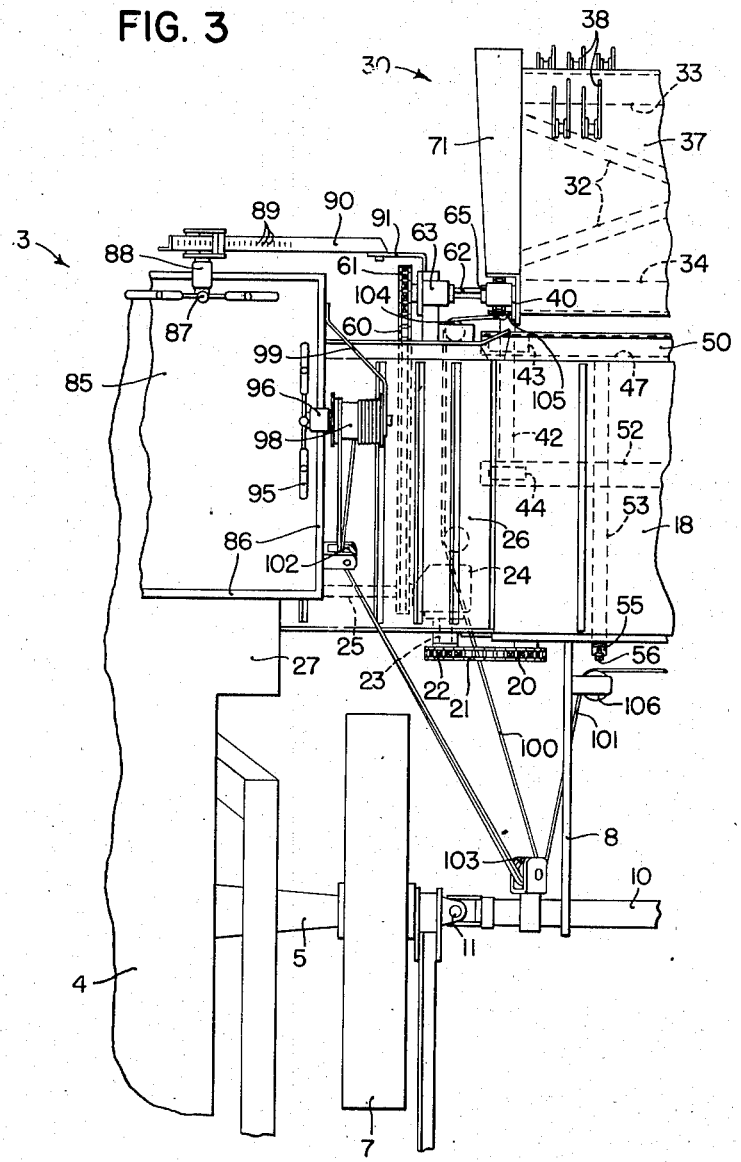

These and other objects and advantages of my invention will be apparent to those skilled in the art after a consideration of the following description, in which reference is had to the drawings appended hereto, in which Figure 1 is a plan view showing a portion of a combine, including a harvester platform and a pick-up device mounted on the platform according to the principles of the present invention; and Figures 2 is an enlarged sectional elevational view taken along a line 2—2 in Figure 1; and Figure 3 is a plan view drawn to an enlarged scale showing more clearly the details of the control mechanism.

Referring now to the drawings, the combine is indicated generally by reference numeral 3 and comprises a body portion 4 of the conventional longitudinally extending type supported on a transverse axle 5, and a harvester platform 6 extending laterally from the body 4. The supporting axle 5 is carried on a pair of laterally spaced ground wheels, disposed on opposite sides of the body 4, respectively, one of which is indicated by reference numeral 7.

The harvester platform 6 is carried on a pair of supporting arms 8, which are fixed to the underside of the platform and extend rearwardly and upwardly therefrom. The rear ends of the arms 8 are rigidly fixed to an axle beam 10, which is connected by means of a universal joint 11 to the end of the body supporting axle 5. The outer end of the axle beam 10 is supported on a ground wheel 12, which is journaled thereon. The outer end of the axle beam 10 is braced against rearward swinging movement by means of a diagonally rearwardly and inwardly extending bracing member 13, which is pivotally connected by a bolt 14 to a frame member 15 extending from the combine body 4.

The platform comprises a pair of front and rear transverse angle frame members 16, 17, suitably interconnected by the usual longitudinal frame members 17' to form a rectangular frame, in which is supported a flexible endless conveyor 18 of the conventional canvas draper type, trained about a pair of rollers 19, disposed at the inner and outer ends of the platform frame, respectively, each roller 19 being journaled at opposite ends, respectively, in the angle frame members 16, 17. The inner roller 19 is driven through a sprocket 20 fixed on the rear end of the shaft, extended rearwardly beyond the supporting frame member 17. The sprocket 20 is driven by a chain 21 from a drive sprocket 22 mounted on a stub shaft 23 extending rearwardly from a gear box 24, and which receives power from a drive shaft 25 extending outwardly from any suitable source of power (not shown) on the body 4. The inner end of the platform conveyor 18 discharges upon a conventional draper 26, which raises the harvested crops from the platform into the feeder house 27 of the combine.

The pick-up device, indicated generally by reference numeral 30, is shown as a conventional belt type pick-up, such as for instance a device similar to that shown in Patent No. 2,253,797, granted to Melroe, August 26, 1941, although I do not intend my invention to be limited to this particular type of pick-up mechanism. The pick-up device 30 comprises a pair of end plates 31 extending longitudinally and spaced laterally and connected together by a pair of diagonal bracing members 32 to form a rigid framework. A pair of transversely disposed front and rear rollers 33, 34 extend between the end plates 31 and are mounted on shafts 35, 36, respectively, which are journaled at opposite ends thereof in the two end plates 31. Trained around the two rollers 33, 34 is an endless conveyor belt 37, formed in one or two or more sections, as desired, and a plurality of spring pick-up teeth or fingers 38 are fastened to the belt, in a manner known to those skilled in the art.

The rear roller shaft 36 is in the form of a hollow tubing, which is journaled at opposite ends, respectively, in a pair of supporting plates or standards 40 at opposite sides of the pick-up device 30 and the plates 40 are interconnected by a suitable transverse frame member 41, disposed beneath the frame of the pick-up device which is swingably supported on the shaft 36. The lower end of each plate 40 is carried on a truck member 42, comprising a structural angle member which extends downwardly and rearwardly beneath the frame of the combine platform 6. Each truck member 42 is carried on a pair of rollers 43, 44, which are journaled on stub axles 45, 46, respectively, which are welded to the truck member 42 in vertically and longitudinally spaced relation. The two forward rollers 43 engage a transversely disposed C-shaped track member 47, which is disposed along the forward edge of the platform 6 in place of the usual cutter bar, and is fixed to a supporting angle member 48, which is detachably secured to the forward side of the front angle frame member 16 by bolts 49. A baffle plate 50 is also supported on the bolts 49 and extends transversely along the forward edge of the platform and serves not only to retain the harvested crop on the conveyor 18, but also serves as a wiping bar for the ends of the teeth 38 as they travel around the roller 34 with the belt 37. The two rear rollers 44 engage a second C-shaped track member 52, which is fixedly supported, as by welding, to a pair of rearwardly extending frame members 53, 54, which are rigidly fixed at their forward ends to the back of the forward track member 47 and extend rearwardly beneath the platform, the rear ends of the members 53 having upwardly extending lugs 55, which are detachably secured by set screws 56 to the rear of the platform frame. Each of the C-shaped tracks 47, 52 is slightly larger than the diameter of the rollers 43, 44, so that the rollers may engage either the top or bottom flange of the tracks, and thus hold the truck frames 42 rigid against vertical movement with respect to the combine platform 6, but permit the truck members 42 to slide laterally along the transverse platform. Thus, the pick-up device 30 can move from the position shown in solid lines in Figure 1 at the inner end of the platform, to the position A, indicated in dotted lines at the outer end of the platform, permitting the pick-up device to be shifted laterally to maintain the latter in alignment with the windrow, and to accommodate lateral variations in the windrow from a straight line path.

Power for driving the pick-up device is transmitted from the drive shaft 25 through a drive chain 60 to a sprocket 61, which is fixed to a shaft 62 of square cross section, which is supported in a pair of bearings 63, 64, which are mounted on the forward end of the harvester platform 6, so that the square shaft 62 is positioned transversely of the line of advance and is coaxial with the upper belt roller 34, passing through the hollow shaft 36. A bushing 65 having a central opening adapted to slidably engage the square shaft 62, is rigidly attached to the roller 34 and transmits power from the square shaft 62 to the roller, but travels laterally with the latter. A sprocket 66 is fixed to the end of the roller 34 and is connected by a chain 68 to a second sprocket 67 on the shaft 35 of the forward roller 33. Although it is possible to drive the belt 37 from the upper roller 34 only, it is preferable to transmit power through the chain 68 to drive the forward roller 33 as well, in order to avoid slippage of the pick-up belt 37. An idler sprocket 69 is provided for tightening the chain 68. Thus, it is evident that the pick-up belt 37 is driven constantly, regardless of the position of lateral adjustment of the pick-up device relative to the platform 6.

During operation, the pick-up frame is free to float along the ground on a pair of laterally spaced runners 70 bolted at their forward ends to the lower end of a guard flange 71, which extends outwardly from the edge of each end plate 31 and serves to protect the chain and sprocket mechanism 67, 68 from being entangled with crop material. The rear end of each of the runners 70 is connected to an extensible leg 72, which is fastened at its upper end to the side plate 31. The curved runners 70 permit the forward end of the pick-up device 30 to rise and fall and thus to avoid damage due to rocks and clods of earth. The pick-up device is prevented from swinging too far downwardly into a hole or ditch, by means of a limit stop 73 attached to the supporting plate 40 on each side of the pick-up device, and is provided with an adjustable set screw 74, which extends through an aperture in the end of the stop 73 and upon which the frame of the pick-up device bears when support is taken from under the runners 70. The pick-up device is counterbalanced by means of a compression coil spring 77, which encircles a rod 78, which is pivotally connected at its forward end to a lug 79 on the leg 72, and extends rearwardly therefrom through an aperture in a bracket 80, fixed to the truck 42. The spring bears against a stop washer 81, which is fixed to the forward end of the rod 78 and reacts against the bracket 80, the spring pressure tending to raise the forward end of the pick-up device 30, and thereby relieve a portion of its weight from the ground and cause the device to float more freely during operation.

The controls for the pick-up device and platform will now be described. As is usual construction on large combines, an operator's platform 85 is provided above the forward end of the body 4 and has the usual railing 86 thereabout. The combine platform 6 is raised and lowered by the operator by means of a hand wheel 87 rotatably supported on a bearing 88, mounted on the railing 86 at the front of the operator's platform. The forward end of the shaft of the wheel 87 is provided with a suitable gear (not shown), which engages a series of holes 89 in a generally vertically disposed angle member 90, which extends from the wheel 87 down to a connection 91 with the inner end of the platform. Thus, by turning the wheel 87 in one direction or another, the platform can be raised and lowered by the operator to maintain the correct height of cut or, when picking up a windrow, the height of the platform can be adjusted to provide the desired clearance above the ground.

A second control wheel 95 is fixed to a shaft 97 which is journaled in a bearing 96 on the railing 86 on the grainward side of the operator's platform 85. A winding drum 98 is rigidly attached to the end of the shaft 97, the outer end of the shaft 97 being supported in a bracket 99 fixed to the railing. The drum 98 is connected with each end of the pick-up device by means of a pair of cables 100, 101, which are wound around the drum 98 in relatively opposite directions, and extend under a pair of pulleys 102 mounted on the side of the operator's platform 85 and pass around a pair of pulleys 103 mounted on a block which is attached to the axle beam 10. From the sheaves 103, one of the cables 100 extends around a pulley 104 mounted on the forward edge of the platform and is connected to an eyebolt 105 (see Figure 2), which is fixed to the supporting plate 40. The other cable 101 extends around a sheave 106 mounted on the inner platform supporting arm 8 and thence extends outwardly along the back wall 107 of the platform to a pulley 108 at the outer rear corner of the platform, over which the cable is trained forwardly to a pulley 109 at the forward outer corner of the platform, and from there along the forward frame member 16 to a suitable connecting bolt in the outer supporting plate 40. Thus, by turning the control wheel 95 in one direction, one of the cables 100 is wound upon the drum 98, while the other cable 101 is unwound, and thus causing the pick-up device to be slid inwardly along the platform toward the combine body 4. By turning the wheel in the opposite direction, the pick-up device is slid outwardly on its rollers 43, 44 toward the outer end of the platform. Thus, the operator of the combine, standing on the platform 85, can control both the height of the platform above the ground and the position of the pick-up device on the platform. Since the pick-up device 30 is comparatively light in weight, it can be moved inwardly and outwardly along the platform much more easily than the tractor could be manipulated to maneuver the entire combine in following a crooked window.

I claim:

1. A harvester comprising a transversely disposed crop receiving platform, a secondary frame, means for supporting said secondary frame on said platform and at the same time providing for lateral shifting movement of said secondary frame relative to said platform, and control means mounted on said harvester and connected to said secondary frame for shifting the latter relative to the platform.

2. A harvester comprising a transversely disposed platform frame, a secondary frame having a width less than that of said platform, track means extending along said platform frame, and rollers journaled on said secondary frame and cooperative with said track means to support said secondary frame for lateral shifting movement along said platform frame.

3. A harvester comprising a transversely disposed platform, a pick-up device having a width less than that of said platform, track means extending along said platform and fixed thereto, rollers journaled on said pick-up device and cooperative with said track means to support said pick-up device on said platform for sliding movement therealong, and control means for adjustably determining the position of said device relative to said frame.

4. A harvester comprising a transversely disposed platform, a pick-up device having a width less than that of said platform and including a frame, a track member extending along the forward edge of said platform, a second track member disposed parallel to said track member and spaced therefrom, and a plurality of rollers journaled on said rigid frame and positioned to engage said track members to support said pick-up frame on said platform and providing for lateral travel along the latter.

5. A harvester comprising a transversely disposed platform, a pick-up device, means for mounting said pick-up device on said platform providing for lateral shifting movement of said device relative thereto, an operator's station on said harvester, a control member at said operator's station, and connections between said member and said pick-up device to provide for optionally shifting said pick-up device relative to said platform by actuating said control member.

6. A harvester comprising a transversely disposed platform, a pick-up device including a frame, means for mounting said pick-up frame on said platform providing for lateral shifting movement of said frame relative thereto, a rotatable drive member journaled on said frame for driving said pick-up device, a drive shaft journaled on the harvester, and a slidable connection between said drive shaft and drive member for transmitting power to said drive member in any position of lateral adjustment of said pick-up device.

7. A harvester comprising a transversely disposed platform, a pick-up device including a frame, means for mounting said pick-up frame on said platform providing for lateral shifting movement of said frame relative thereto, a rotatable drive member journaled on said frame for driving said pick-up device, a drive shaft journaled on the harvester, a shiftable connection between said drive shaft and drive member for transmitting power to said drive member in any position of lateral adjustment of said pick-up device, an operator's station on said harvester, a control member at said operator's station, and connections between said control member and said pick-up device to provide for optionally shifting said pick-up device relative to said platform by actuating said control member.

8. A harvester comprising a transversely disposed platform, a pick-up device having a width less than that of said platform and including a frame, a pair of fore and aft spaced rollers journaled on said frame, a flexible pick-up member trained over said rollers and having crop engaging teeth attached thereto, a track member extending along the forward edge of said platform and fixed thereto, a second track member fixed beneath said platform parallel to said track member, a plurality of rollers journaled on said pickup frame and cooperative with said track members to support the pick-up device on said platform and providing for lateral shifting movement therealong, a drive shaft journaled on said harvester generally coaxial with one of said pick-up rollers, and a sliding power connection between said shaft and said coaxial roller for transmitting power to drive said pick-up member in any position of lateral adjustment of said device.

9. A harvester comprising a wheel supported frame, a platform disposed transversely and supported on said frame by means providing for vertical swinging movement relative thereto about a generally transverse axis, a pick-up device, means for mounting said pick-up device on said platform providing for lateral shifting movement of said device relative thereto, a flexible cable attached to said pick-up device, a control member mounted on said wheel supported frame and connected to said cable, and a sheave mounted adjacent said axis of vertical movement of said platform, over which sheave said cable is trained.

10. A harvester comprising a transversely disposed platform, a pick-up device having a width less than that of said platform and including a frame, a pair of fore and aft spaced rollers journaled on said frame, a flexible pick-up member trained over said rollers and having crop engaging teeth attached thereto, a track member extending along the forward edge of said platform and fixed thereto, a second track member fixed beneath said platform parallel to said track member, a plurality of rollers journaled on said pick-up frame and cooperative with said track members to support the pick-up device on said platform and providing for lateral shifting movement therealong, a drive shaft journaled on said harvester generally coaxial with one of said pick-up rollers, a sliding power connection between said shaft and said coaxial roller for transmitting power to drive said pick-up member in any position of lateral adjustment of said device, an operator's station on said harvester, a control member at said operator's station, and connections between said control member and said pick-up device to provide for optionally shifting said pick-up device relative to said platform by actuating said control member.

11. A harvester comprising a transversely disposed platform, a pick-up device having a width less than that of said platform and including a frame, a pair of fore and aft spaced rollers journaled on said frame, a flexible pick-up member trained over said rollers and having crop engaging teeth attached thereto, a track member extending along the forward edge of said platform and fixed thereto, a second track member fixed beneath said platform parallel to said track member, a plurality of rollers journaled on said pick-up frame and cooperative with said track members to support the pick-up device on said platform and providing for lateral shifting movement therealong, a drive shaft journaled on said harvester generally coaxial with one of said pick-up rollers, a sliding power connection between said shaft and said coaxial roller for transmitting power to drive said pick-up member in any position of lateral adjustment of said device, a flexible cable attached to said pick-up device, and a control member disposed remotely from said platform and connected with said cable to provide for optionally shifting said pick-up device relative to said platform by actuating said control member.

12. A harvester comprising a wheel supported frame, a platform disposed transversely and supported on said frame by means providing for vertical swinging movement relative thereto about a generally transverse axis, a pick-up device having a width less than that of said platform and including a frame, a pair of fore and aft spaced rollers journaled on said frame, a flexible pick-up member trained over said rollers and having crop engaging teeth attached thereto, a track member extending along the forward edge of said platform and fixed thereto, a second track member fixed beneath said platform parallel to said track member, a plurality of rollers journaled on said pick-up frame and cooperative with said track members to support the pick-up device on said platform and providing for lateral shifting movement therealong, a drive shaft journaled on said harvester generally coaxial with one of said pick-up rollers, a sliding power connection between said shaft and said coaxial roller for transmitting power to drive said pick-up member in any position of lateral adjustment of said device, a flexible cable attached to said pick-up device, a control member mounted on said wheel supported frame and connected to said cable, and a sheave mounted adjacent said axis of vertical movement of said platform, over which sheave said cable is trained.

13. A harvester comprising a transversely disposed platform, a pick-up device including a frame, means for mounting said pick-up frame on said platform providing for lateral shifting movement of said frame relative thereto, a drive shaft journaled on said platform, a rotatable drive member journaled on said frame for driving said pick-up device and having an axially disposed opening therein adapted to receive said drive shaft, said shaft coacting with said opening in said drive member to provide for relative sliding movement in an axial direction but transmitting rotary power therebetween.

FLOYD R. MARTIN.